(12) United States Patent
Lam et al.

(10) Patent No.: US 11,416,333 B2
(45) Date of Patent: Aug. 16, 2022

(54) SEMICONDUCTOR DEVICE WITH POWER-SAVING MODE AND ASSOCIATED METHODS AND SYSTEMS

(71) Applicant: Micron Technology, Inc., Boise, ID (US)

(72) Inventors: Boon Hor Lam, Boise, ID (US); Karl L. Major, Boise, ID (US); Loon Ming Ho, Boise, ID (US); Dennis G. Montierth, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 51 days.

(21) Appl. No.: 16/548,397

(22) Filed: Aug. 22, 2019

(65) Prior Publication Data
US 2021/0055986 A1 Feb. 25, 2021

(51) Int. Cl.
*G06F 11/10* (2006.01)

(52) U.S. Cl.
CPC ...... *G06F 11/1044* (2013.01); *G06F 11/1016* (2013.01)

(58) Field of Classification Search
CPC .......................... G06F 11/1044; G06F 11/1016
USPC ........................................................ 714/763
See application file for complete search history.

(56) References Cited

U.S. PATENT DOCUMENTS

| | | | | |
|---|---|---|---|---|
| 2006/0123320 A1* | 6/2006 | Vogt | ..................... | G11C 7/1006 714/762 |
| 2008/0201626 A1* | 8/2008 | Sturm | ................. | G11C 11/4096 714/763 |
| 2009/0003120 A1* | 1/2009 | Mueller | ............... | G11C 7/1045 365/230.06 |
| 2011/0047442 A1* | 2/2011 | Dave | .................. | G06F 11/1068 714/773 |
| 2012/0151299 A1* | 6/2012 | Suh | .................. | G11C 29/50016 714/764 |
| 2012/0182821 A1* | 7/2012 | Perego | ................ | G06F 11/1048 365/230.03 |
| 2017/0308433 A1* | 10/2017 | Kwon | ..................... | G11C 29/52 |
| 2018/0203627 A1* | 7/2018 | Gilda | .................... | G06F 1/3275 |
| 2019/0130991 A1* | 5/2019 | Son | ......................... | G11C 29/42 |

* cited by examiner

*Primary Examiner* — James C Kerveros
(74) *Attorney, Agent, or Firm* — Perkins Coie LLP

(57) ABSTRACT

Memory devices, systems including memory devices, and methods of operating memory devices are described, in which a host device may disable ECC functions of the memory devices. When the ECC function is disabled by the host device, the memory device may deactivate various ECC periphery components coupled with an ECC circuit of the memory device to reduce power consumption of the memory device. In some cases, the memory device may disconnect an electrical power supply to the ECC periphery components. In other cases, the memory device may selectively disable the ECC periphery components or block an access command from reaching the ECC periphery components during an access operation. Further, the ECC array may be configured to replace faulty portions of a main array of the memory device when the ECC function is disabled.

20 Claims, 6 Drawing Sheets

SEMICONDUCTOR DEVICE WITH POWER-SAVING MODE AND ASSOCIATED METHODS AND SYSTEMS

TECHNICAL FIELD

The present disclosure generally relates to semiconductor devices, and more particularly relates to a semiconductor device with a power-saving mode and associated methods and systems.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including random-access memory (RAM), static random access memory (SRAM), dynamic random access memory (DRAM), and synchronous dynamic random access memory (SDRAM), among others, require a source of applied power to maintain its data. Non-volatile memory, by contrast, can retain its stored data even when not externally powered. Non-volatile memory is available in a wide variety of technologies, including flash memory (e.g., NAND and NOR), phase change memory (PCM), ferroelectric random access memory (FeRAM), resistive random access memory (RRAM), and magnetic random access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

DETAILED DESCRIPTION

Figure 1:
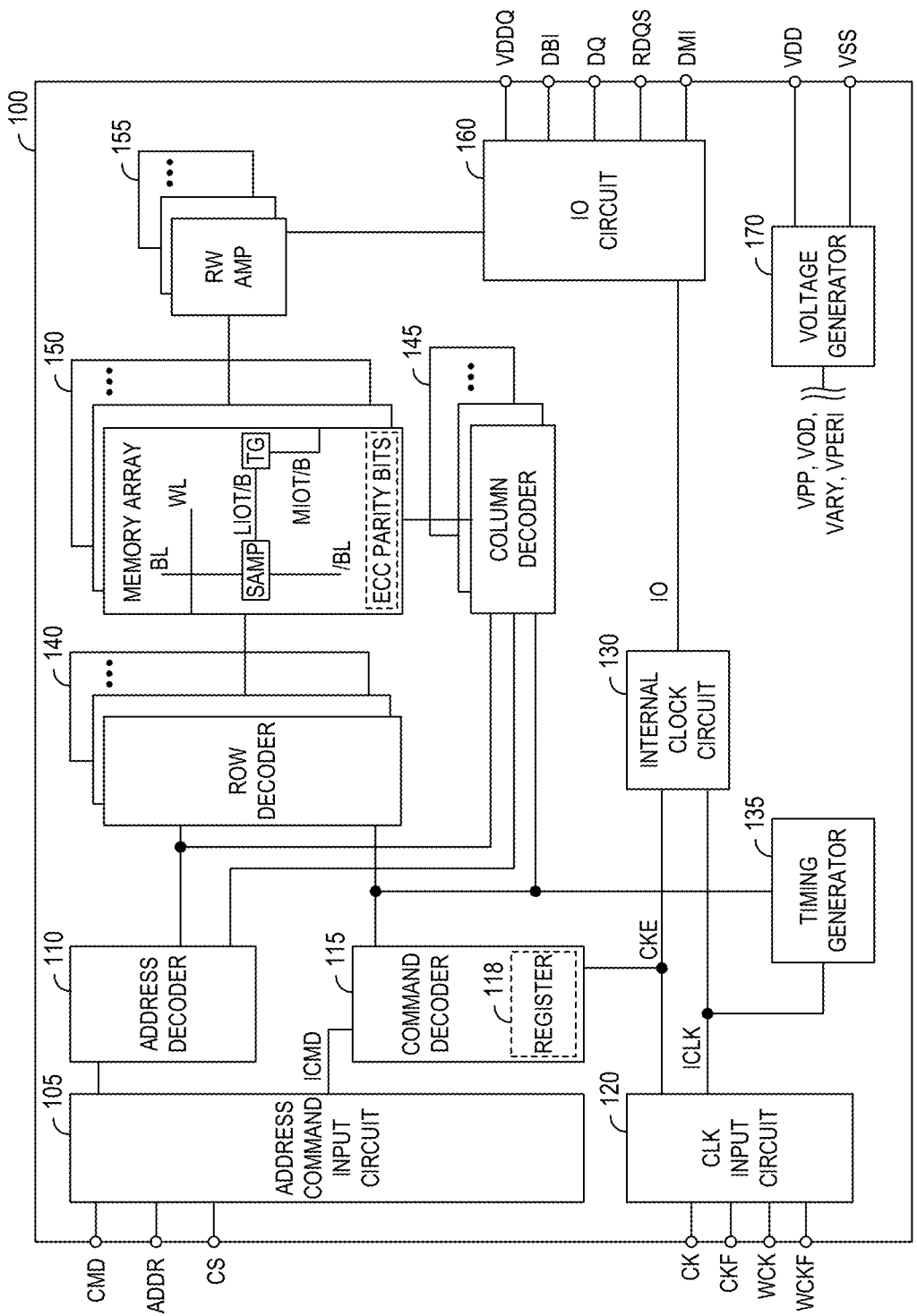
FIG. 1 is a block diagram schematically illustrating a memory device in accordance with an embodiment of the present technology.

A memory device may include error checking and correcting (ECC) functions to generate reliable data—e.g., on-die ECC function. An algorithm, program, or circuitry that performs the ECC function may be referred to as or include aspects of error-correcting codes (error correction codes). Such a memory device may include an ECC circuit and a group of memory cells (e.g., a portion of memory array configured to store ECC parity bits, and which may be variously referred to as an ECC array, an ECC plane, and/or a parity plane) that performs the on-die ECC function—e.g., detecting or correcting errors in user data, encoding or decoding ECC data associated with the user data, storing or retrieving the ECC data at or from the ECC array. The ECC circuit and the ECC array may be coupled with various periphery components (e.g., row drivers, column drivers, sense amplifiers, input/output lines) of the memory device that support the on-die ECC function. Such periphery components may be referred to as ECC periphery components. In some memory systems that include a host device and memory devices equipped with on-die ECC functions, the host device (or the memory system) may perform its own ECC functions without relying on the on-die ECC functions. For example, the host device may be configured to perform a system level ECC function independent of the ECC data and/or the ECC algorithm of the memory devices. As a result, the on-die ECC functions may not be required by the memory system (or the host device), and the memory devices may be configured to provide additional features (e.g., a power-saving mode) that may be otherwise unavailable.

Several embodiments of the present technology are directed to memory devices, systems including memory devices, and methods of operating memory devices in which a host device may disable ECC functions of the memory devices. As set forth herein, the memory device may update a register (e.g., a mode register) of the memory device to indicate that the ECC function is disabled by the host device. Further, the memory device may deactivate various ECC periphery components coupled with an ECC circuit and an ECC array of the memory device. In an embodiment, deactivating the ECC periphery components may include disconnecting an electrical power supply to the ECC periphery components. In another embodiment, deactivating the ECC periphery components may include blocking (e.g., masking) an access command from reaching the ECC periphery components. In yet another embodiment, deactivating the ECC periphery components may include disabling the ECC periphery components during an access operation.

In some embodiments, the ECC array may be configured to permanently replace (e.g., repair) one or more faulty portions of the memory array (e.g., main array) when the ECC function of the memory device is disabled. Information related to such replacement (e.g., address mapping information) may be stored in a nonvolatile memory array (e.g., fuse array) of the memory device such that the information may be maintained when the memory device is powered off. In one embodiment, a section of ECC array may replace a section (or at least some part of the section) of the main array that has been determined to be faulty. The section of main array may correspond to a column plane that includes a quantity of columns where each column of the column plane is coupled with a predetermined quantity of memory cells (e.g., 1,024 memory cells). In another embodiment, one or more columns of the ECC array may replace one or more columns of the main array that have been determined to be faulty. In some embodiments, such replacements may be carried out as part of manufacturing process of the memory devices.

A memory device that supports an embodiment of the present technology is described with reference to FIG. 1.

Figure 2:
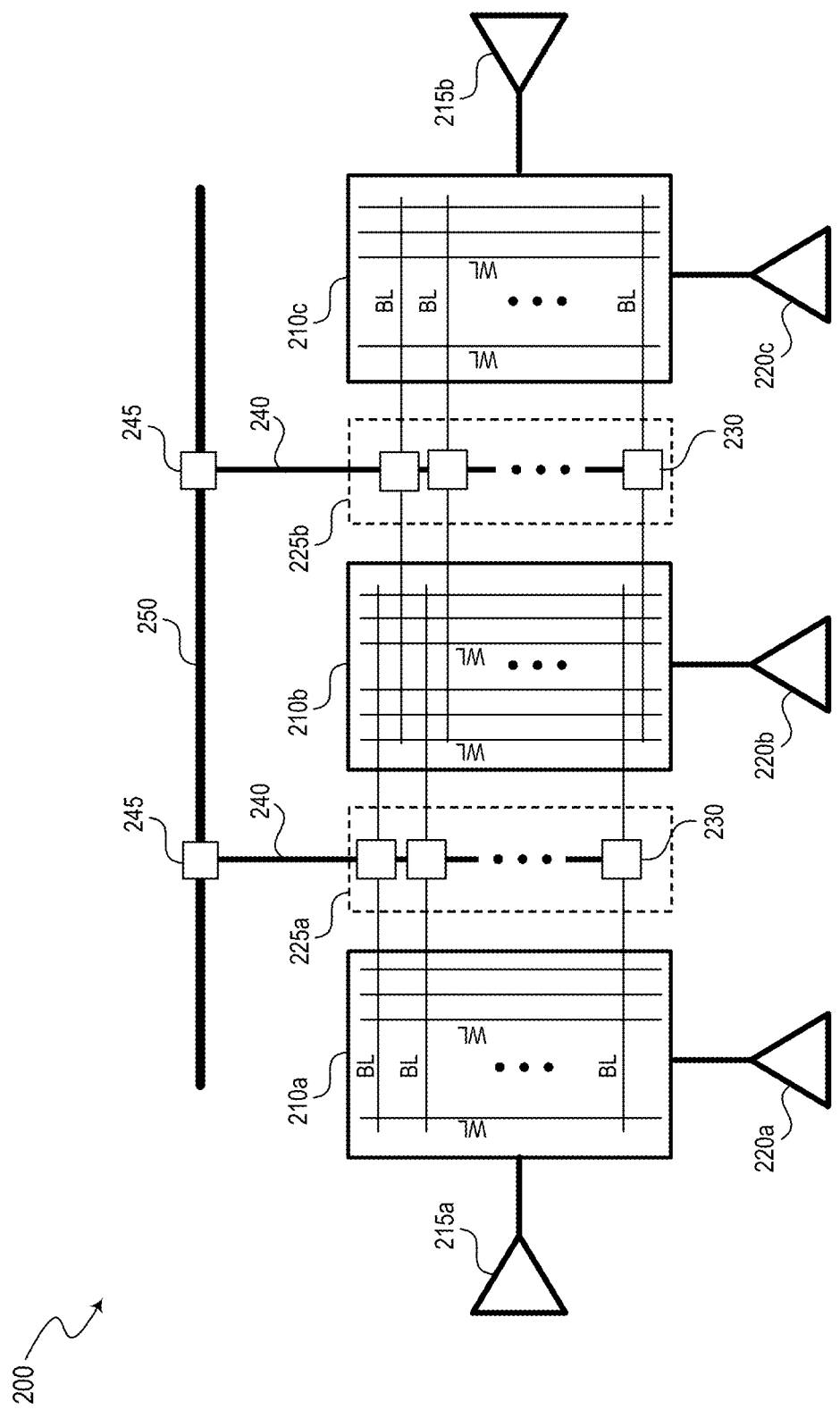
FIG. 2 is a block diagram schematically illustrating a memory array structure of a memory device in accordance with an embodiment of the present technology.
Figure 3:
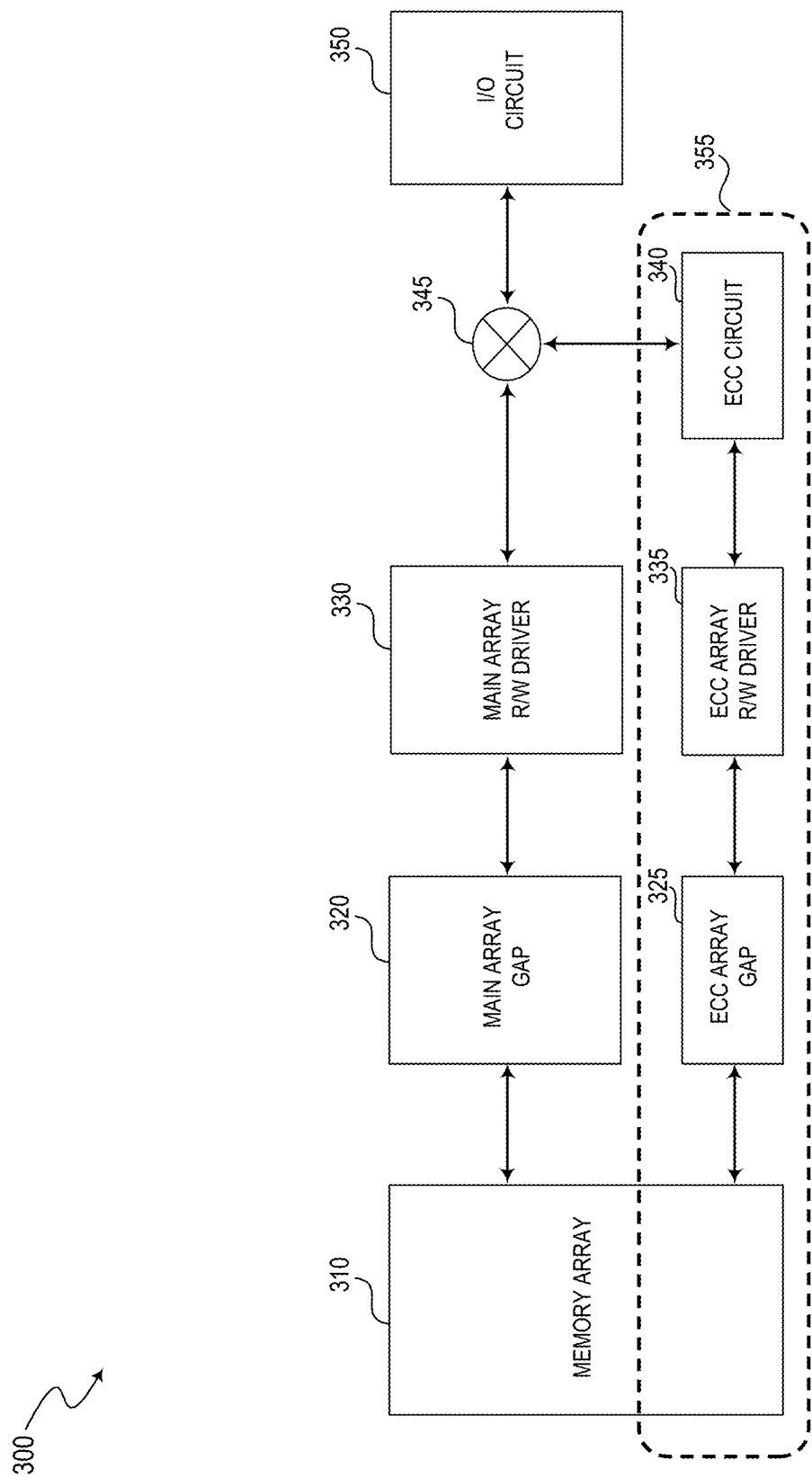
FIG. 3 is a block diagram schematically illustrating various power-saving modes of a memory device in accordance with an embodiment of the present technology.
Figure 4:
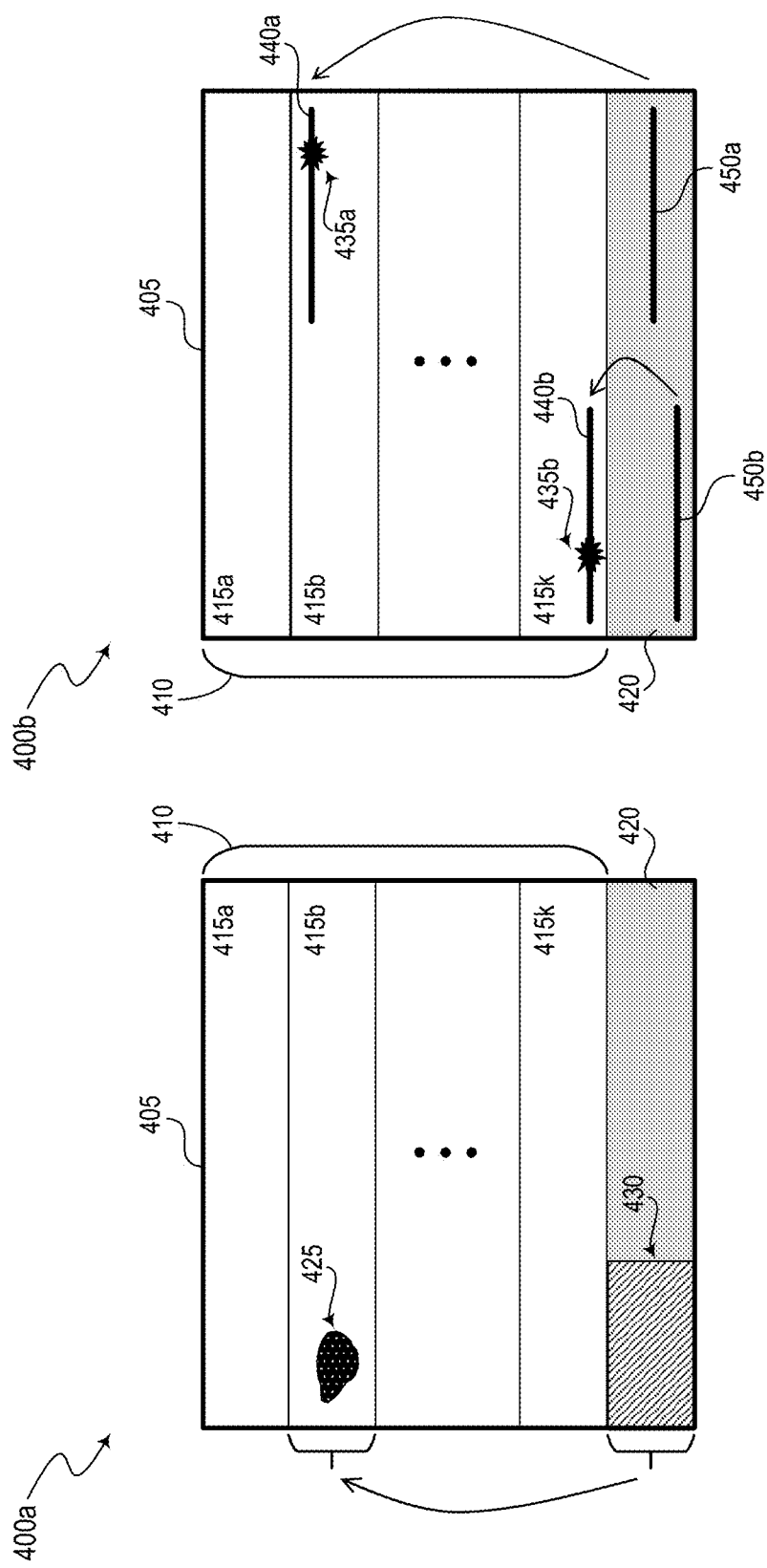
FIG. 4 shows block diagrams schematically illustrating various schemes of repairing a memory array of a memory device in accordance with an embodiment of the present technology.

More detailed descriptions of the memory device (e.g., a memory array structure) are provided with reference to FIG. 2. FIG. 3 illustrates various aspects of power-saving modes associated with operating the memory device in accordance with an embodiment of the present technology. FIG. 4 describes various schemes of memory array repairs within a memory device in accordance with an embodiment of the present technology. A memory system that supports an embodiment of the present technology is described with reference to FIG. 5. A flowchart illustrating a method of operating the memory device is described with reference to FIG. 6.

FIG. 1 is a block diagram schematically illustrating a memory device 100 in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells (e.g., m×n memory cells) arranged at intersections of the word lines (e.g., m word lines, which may also be referred to as rows) and the bit lines (e.g., n bit lines, which may also be referred to as columns). Memory cells can include any one of a number of different memory media types, including capacitive, phase change, magnetoresistive, ferroelectric, or the like. In some embodiments, a portion of the memory array 150 may be configured to store ECC parity bits. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

In some embodiments, the memory array 150 includes a plurality of memory cells, where the memory array includes a first portion (e.g., a main array) configured to store user data and a second portion (e.g., an ECC array) configured to store ECC data associated with the user data. In some embodiments, the memory device 100 includes an ECC circuit (not shown in FIG. 1) that is coupled with the second portion and performs an ECC function for the user data. In some embodiments, the ECC circuit may be configured to detect two or more errors and/or to correct one or more errors in the user data. For example, the ECC circuit may detect two bits of errors and correct one bit of error in the user data. In some embodiments, the ECC circuit may be configured to indicate that the user data include a quantity of errors greater than its detection and correction capability. Further, the memory device 100 may include a register (e.g., a mode register) configured to indicate whether the ECC function is enabled or disabled.

When the ECC function of the memory device 100 is disabled, the second portion may be configured to store other data (e.g., data other than the ECC data associated with the user data) in an embodiment. In another embodiment, when the ECC function of the memory device 100 is disabled, the second portion may be configured to replace a portion of the first portion that has been determined to be faulty (e.g., defective). In yet another embodiment, when the ECC function of the memory device 100 is disabled, the second portion may be deactivated (e.g., not used). Further, when the ECC function of the memory device 100 is disabled, the memory device 100 may deactivate various ECC periphery components coupled with the ECC circuit and the ECC array—e.g., sense amplifiers coupled with the ECC array, input/output lines coupled with the ECC array, column drivers coupled with the ECC array, or a combination thereof.

In some embodiments, the second portion may be organized to be physically adjacent (or in close proximity) to the first portion such that certain components of the memory device 100 (e.g., sense amplifiers (SAMP), row decoder 140, column decoder 145, read/write amplifier 155) that support the first portion and the second portion may be shared or efficiently laid out. In other embodiments, the second portion may be organized to be separate from the first portion such that the first portion and the second portion may operate relatively independently of each other—e.g., the first and second portions having separate power domains, separate routings of control and/or data paths.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI (for data bus inversion function), and DMI (for data mask inversion function), power supply terminals VDD, VSS, VDDQ, and VSSQ.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140 (which may be referred to as a row driver), and a decoded column address signal (YADD) to the column decoder 145 (which may be referred to as a column driver). The address decoder 110 can also receive the bank address portion of the ADDR input and supply the decoded bank address signal (BADD) and supply the bank address signal to both the row decoder 140 and the column decoder 145. In some cases, the row decoder 140 may activate a row (e.g., row i of m rows) that is common to the first portion and the second portion based on the decoded row address signal (XADD) supplied by the address decoder 110.

The command and address terminals may be supplied with command signals CMD, address signals ADDR, and chip select signals CS, from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK (not shown in FIG. 1).

The command decoder 115, in some embodiments, may further include one or more registers 118 for tracking various counts or values (e.g., counts of refresh commands received by the memory device 100 or self-refresh operations performed by the memory device 100). In some embodiments, a subset of registers 118 may be referred to as mode registers and configured to store user-defined variables to provide flexibility in performing various functions, features, and modes. For example, the memory device may receive a signaling from a host device at the mode registers indicating whether an ECC mode of the memory device is enabled or disabled. The memory device, based on the indication stored at the mode registers, may access the ECC parity bits of memory array 150 and perform various operations—e.g., executing the ECC function using the ECC parity bits, storing/retrieving user-accessible data or metadata at/from the ECC parity bits. In some embodiments, when the ECC function is disabled, the memory device 150 may deactivate various ECC periphery components to reduce power consumption.

When a read command is issued to a bank with an open row and a column address is timely supplied as part of the read command, read data can be read from memory cells in the memory array 150 designated by the row address (which may have been provided as part of the Activate command identifying the open row) and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (e.g., the register 118). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open row and a column address is timely supplied as part of the write command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (e.g., register 118). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks. In some embodiments, the internal potential VPERI may be connected to or disconnected from the ECC periphery components based on whether the ECC function is enabled or disabled. In some embodiments, the internal voltage generator circuit 170 may generate an internal potential that can be used to provide electric power to the ECC periphery components.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command decoder 115. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The 10 clock signals can be supplied to the input/output circuit 160 and can be used as a timing signal for determining an output timing of read data and the input timing of write data. The 10 clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 can be connected to any one of a number of electronic devices capable of utilizing memory for the temporary or persistent storage of information, or a component thereof. For example, a host device of memory device 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to memory device 100, although in other embodiments, the host device may be indirectly connected to memory device (e.g., over a networked connection or through intermediary devices).

FIG. 2 is a block diagram schematically illustrating an architecture of a memory array 200 as part of a memory device (e.g., the memory device 100) in accordance with an embodiment of the present technology. The memory array 200 may be an example or include aspects of the memory array 150 described with reference to FIG. 1. The memory array 200 includes a plurality of memory cells that may be organized into multiple sections 210 (e.g., sections 210a through 210c). Each section 210 may include a plurality of rows (word lines WL) and a plurality of columns (bit lines BL), where each intersection of the rows and the columns corresponds to a memory cell. The plurality of columns of the sections 210 may be driven by one or more column drivers 215. The column drivers 215 may be examples or include aspects of the column decoder 145. Also, the plurality of rows of the sections 210 may be driven by one or more row drivers 220. The row drivers 220 may be examples or include aspects of the row decoder 140.

The memory array 200 may include one or more gaps 225 (e.g., a gap 225a, a gap 225b). In some embodiments, the gaps 225 may refer to spaces between two sections 210—e.g., the gap 225a between the section 210a and the section 210b, the gap 225b between the section 210b and the section 210c. Each gap 225 may include a plurality of sense amplifiers 230. The sense amplifiers 230 may be examples or include aspects of the SAMP described with reference to FIG. 1. Further, the plurality of sense amplifiers 230 may be coupled with a plurality of local input/output lines 240. The local input/output lines 240 may be examples or include aspects of the local I/O line pair (LIOT/B) described with reference to FIG. 1. The plurality of local input/output lines 240 may be configured to couple with a plurality of global input/output lines 250 via switch components 245. The plurality of global input/output lines 250 may be examples or include aspects of the main I/O line pair (MIOT/B) described with reference to FIG. 1. The switch components 245 may be an example or include aspects of the transfer gates (TG) described with reference to FIG. 1. The global input/output lines 250 may be coupled with an input/output circuit (e.g., the 10 circuit 160) of the memory device.

The memory array 200 is configured to identify a specific gap 225 (hence, various components therein, such as the sense amplifiers 230 and the local input/output lines 240) when an address of an access command is decoded. For example, when the memory device decodes an address (using the address decoder 110) associated with an access command to identify a row (e.g., using the decoded row address signal XADD) and a column (e.g., using the decoded column address signal YADD) of a section (e.g., the section 210a, the section 210b, the section 201c), the memory device may activate a corresponding column driver 215 (e.g., the column driver 215a) and a corresponding row driver 220 (e.g., the row driver 220a) to couple the identified memory cell (e.g., a memory cell in the section 210a) with a sense amplifier 230 of a gap 225 (e.g., the gap 225a).

In some embodiments, a memory device may include a main array and an ECC array that each are configured in accordance with the architecture of memory array 200 described above. As such, the main array may include a first plurality of rows that are coupled with a first plurality of row drivers, and the ECC array may include a second plurality of rows that are coupled with a second plurality of row drivers. Further, the main array may include a first plurality of column drivers, and the ECC array may include a second plurality of column drivers. Additionally, the main array and the ECC array each may include one or more gaps (hence, various components therein, such as the sense amplifiers 230 and the local input/output lines 240) based on a quantity of sections included in the main array and the ECC array. When the ECC function of the memory device is disabled, the memory device may deactivate the second plurality of row drivers coupled with the ECC array such that the memory device may consume less electrical power. Additionally or alternatively, the memory device may deactivate the ECC periphery components, such as the second plurality of column drivers, the gaps (e.g., the sense amplifiers therein, the local input/output lines therein, or other circuitry located therein) associated with the ECC array.

In other embodiments, a memory device may include a main array and an ECC array that are each configured in accordance with the architecture of memory array 200, except that a plurality of row drivers may be shared by the main array and the ECC array such that an area occupied by the plurality of row drivers may be reduced. Accordingly, a plurality of row drivers coupled with the plurality of rows may be common to the main array and the ECC array. That is, the plurality of row drivers may be coupled with the plurality of rows, where each row of the plurality of rows is coupled with a first quantity of memory cells of the main array and a second quantity of memory cells of the ECC array. Further, the main array may include a first plurality of column drivers and the ECC array may include a second plurality of column drivers. Additionally, the main array and the ECC array each may include one or more gaps (hence, various components therein, such as the sense amplifiers 230 and the local input/output lines 240) based on a quantity of sections included in the main array and the ECC array. When the ECC function of the memory device is disabled, the memory device may deactivate the ECC periphery components, such as the second plurality of column drivers and the gaps (the sense amplifiers and the local input/output lines therein) associated with the ECC array.

FIG. 3 is a block diagram 300 schematically illustrating various power-saving modes of a memory device (e.g., the memory device 100) in accordance with an embodiment of the present technology. The block diagram 300 may be an example or include aspects of the memory array 200. The block diagram 300 illustrates a memory array 310 that includes a main array (e.g., a first portion) and an ECC array (e.g., a second portion). As described herein with reference to FIG. 2, the main array and the ECC array may share a plurality of row drivers of the memory array 310 in some cases. In other cases, the main array may be coupled with a first plurality of row drivers and the ECC array may be coupled with a second plurality of row drivers. The block diagram 300 also illustrates a main array gap 320, an ECC array gap 325, a main array read/write driver 330, an ECC array read/write driver 335, an ECC circuit 340, a consolidating component 345, an input/output circuit 350.

The main array gap 320 may be an example or include aspects of the array gaps 225. The main array gap 320 may include a first plurality of sense amplifiers coupled with memory cells of the main array. Additionally, the main array gap 320 may include a first plurality of local input/output lines coupled with the first plurality of sense amplifiers. Further, the first plurality of local input/output lines may be coupled with a first plurality of global input/output lines via a first plurality of transfer gates (TG) as described with reference to FIG. 2. Similarly, the ECC array gap 320 may be an example or include aspects of the array gaps 225. The ECC array gap 325 may include a second plurality of sense amplifiers coupled with memory cells of the ECC array. Additionally, the ECC array gap 325 may include a second plurality of local input/output lines coupled with the second plurality of sense amplifiers. Further, the second plurality of local input/output lines may be coupled with a second plurality of global input/output lines via a second plurality of transfer gates (TG) as described with reference to FIG. 2.

The main array read/write driver 330 may be an example or include aspects of the column drivers 215 or the column decoder 145 described with reference to FIGS. 1 and 2. That is, the main array read/write driver 330 may be coupled with memory cells of the main array. The main array read/write driver 330, in conjunction with the first plurality of sense amplifiers and/or the first plurality of local input/output lines in some cases, may read information from the memory cells of the main array or write information at the memory cells of the main array. Similarly, the ECC array read/write driver 330 may be an example or include aspects of the column drivers 215 or the column decoder 145. That is, the ECC array read/write driver 330 may be coupled with memory cells of the ECC array. The ECC array read/write driver 330, in conjunction with the second plurality of sense amplifiers and/or the second plurality of local input/output lines in some cases, may read information from the memory cells of the ECC array or write information at the memory cells of the ECC array.

The ECC circuit 340 may be an example or include aspects of the ECC circuit described with reference to FIG. 1. That is, the ECC circuit 340 may perform the ECC function of the memory device—e.g., detecting two or more errors and/or correcting one or more errors in the user data when the ECC function is enabled. In some embodiments, during a write operation, the ECC circuit 340 may generate (e.g., encode) ECC data as part of the ECC function based on checking an error status of the user data. Subsequently, the ECC circuit 340 may store the ECC data in the ECC array, in conjunction with the ECC array gap 325 (e.g., the second plurality of sense amplifiers, the second plurality of input/output lines). Similarly, the ECC circuit 340, in conjunction with the ECC array gap 325, may retrieve ECC data from the ECC array to decode the ECC data associated with the user data during a read operation. Subsequently, the memory device, in conjunction with the ECC circuit 340 that has decoded the ECC data, may consolidate the ECC data with the user data retrieved from the main memory using the consolidating component 345.

The input/output circuit 350 may be an example or include aspects of the input/output (IO) circuit 160 described with reference to FIG. 1. During a read operation, the input/output circuit 350 may parallelize the user data that has been checked (e.g., using the ECC circuit 340) and consolidated with the ECC data (e.g., using the consolidating component 345). For example, the input/output circuit 350 may produce a data burst to transmit the user data (e.g., to a host device) during a fixed length of data bursts (e.g., a burst length sixteen (16) corresponding to eight (8) clock cycles) over a plurality of data terminals DQ.

The block diagram 300 further illustrates a power domain 355. The power domain 355 may refer to a scheme and/or a region in which the memory device may provide electric power to one or more components of the memory device. In some cases, the power domain 355 may be coupled with an electric power supply (not shown in FIG. 3), which may be an example of an electric potential that the internal voltage generator circuit 170 may generate as described with reference to FIG. 1. The power domain 355 may include the ECC array gap 325 (e.g., the second plurality of sense amplifiers, the second plurality of local input/output lines), the ECC array read/write driver 335, the ECC circuit 340, or a combination thereof. In some cases, when the main array is coupled with the first plurality of row drivers and the ECC array is coupled with the second plurality of row drivers, the power domain 355 may include the ECC array (and/or the second plurality of row drivers coupled with the ECC array). In other cases, when the main array and the ECC array share a plurality of row drivers of the memory array 310, the power domain 355 may not include the ECC array. In some embodiments, when the power domain 355 is disabled or an electrical power supply is disconnected from the power domain 355 (e.g., the electrical potential generated by the internal voltage generator circuit 170 is removed from the power domain 355), all the components included in the power domain 355 (e.g., the ECC array gap 325, the ECC array read/write driver 335, the ECC circuit 340, and the second plurality of row drivers in some cases) may be powered off.

When the ECC function of the memory device is disabled (e.g., by a host device), the memory device may update a register (e.g., a mode register) to indicate the ECC function is disabled—e.g., during a power-up and/or a mode reset procedures for the memory device. Further, the memory device may determine, during an access operation as an example, that the ECC function is disabled based on accessing the register and deactivate one or more components coupled with the ECC circuit 340—e.g., the ECC periphery components, such as the ECC array gap 325 including the second plurality of sense amplifiers and/or the second set of local input/output lines, the ECC array read/write driver 335. Further, the memory device may also deactivate the ECC circuit 340.

In some embodiments, deactivating a component (e.g., a sense amplifier, a row driver, a column driver) may refer to disconnecting an electrical power supply from the component. As a result, the component may not consume any electrical power, rendering the memory device more efficient from a power-saving perspective. Such embodiments, however, may involve one or more additional switches to permit the electrical power supply to be connected to and disconnected from the component. As a result, the one or more switches may increase a die area that the memory device occupies—e.g., inefficient from the memory device's layout and/or die cost perspectives. Further, powering up and down the component may incur undesirable delays or interferences during the memory device operations in some cases.

In some embodiments, deactivating a component (e.g., a sense amplifier, a row driver, a column driver) may include disabling the component while an electrical power supply remains connected to the component. A disabled component may not respond to one or more inputs that otherwise cause the component to respond. For example, disabled input/output lines may stop toggling (e.g., maintaining a constant voltage level) during an access operation (e.g., a read operation, a write operation). In some embodiments, the memory device may generate a signal (e.g., a signal similar to the select signal CS described with reference to FIG. 1) that disables the component when the signal is transmitted to the component. Accordingly, the component may remain disabled during an access operation and the memory device may reduce power consumption.

In some embodiments, deactivating the component may include blocking (e.g., masking) a command (e.g., an access command) from reaching the component. In such embodiments, the component may be connected to the electrical power supply and the component would have responded when a signal associated with the command reaches the component. The memory device, however, may be configured to block the signal from reaching the component to prevent the component from participating in the access operation (e.g., sense amplifiers latching signals from memory cells, input/output lines toggling during the access operation) such that the memory device may reduce power consumption.

In some embodiments, the memory array 310 may include a plurality of rows coupled with a plurality of row drivers, where each row of the plurality of rows is coupled with a first memory cell of the first portion (e.g., the main array) and a second memory cell of the second portion (e.g., the ECC array). That is, the first portion and the second portion may share a common set of rows coupled with the plurality of row drivers. When the memory device determines the ECC function is disabled based on accessing the register (e.g., the mode register configured to indicated whether the ECC function is enable or disabled), the memory device may disable the second plurality of sense amplifiers in the ECC array gap 325 during an access operation. In some cases, the memory device may maintain the second plurality of sense amplifiers, when disabled, in a precharge state during the access operation. Additionally or alternatively, the memory device may maintain the second plurality of input/output lines in the ECC array gap 325 at a constant voltage level during the access operation. Additionally or alternatively, the memory device may disable the ECC array read/write driver 335 during the access operation.

In some embodiments, the memory array 310 may include a first plurality of row drivers coupled with a first plurality of rows of the first portion (e.g., main array) and a second plurality of row drivers coupled with a second plurality of rows of the second portion (e.g., ECC array). That is, the first portion and the second portion may be separately arranged to include two different sets of rows that each coupled with two different sets of row drivers. In such embodiments, when an access command directed to the memory array is received, the memory device may deactivate the second plurality of row drivers after determining that the ECC function is disabled based on accessing the register (e.g., the mode register configured to indicated whether the ECC function is enable or disabled). Additionally or alternatively, the memory device may disable the second plurality of sense amplifiers in the ECC array gap 325 (e.g., maintaining the second plurality of sense amplifiers in a precharge state), maintain the second plurality of input/output lines in the ECC array gap 325 at a constant voltage level, and/or disable the ECC array read/write driver 335 during the access operation.

FIG. 4 shows block diagrams 400 that schematically illustrate various schemes of repairing a memory array in accordance with an embodiment of the present technology. Block diagrams 400 includes a memory array 405 comprising a main array 410 (e.g., a first portion) and an ECC array 420 (e.g., a second portion). The memory array 405 may be an example or include aspects of the memory array 150, the memory array 200, or the memory array 310 described with reference to FIGS. 1 through 3. In some embodiments, the main array 410 may include a plurality of column planes 415 (e.g., column planes 415a through 415k). Column planes may refer to portions of the main array 410 where each portion includes a common quantity of columns (e.g., 512 columns).

For example, the main array 410 may include a plurality of rows (e.g., 1,024 rows) and a plurality of columns (e.g., 4,096 columns, namely 512 columns per column plane×8 column planes when k corresponds to 8 as an example). Further, each column may be coupled with a quantity of memory cells (e.g., 1,024 memory cells per column). In some embodiments, individual columns from each column planes may be configured to form a set of columns—e.g., 512 sets of columns each including 8 columns, one from each column planes. The sets of columns (e.g., 512 sets of columns) may be coupled with a column decoder/driver configured to select each set of columns at a time. Accordingly, the column decoder/driver may concurrently access k memory cells (e.g., 8 memory cells) from k column planes (e.g., 8 column planes) at a time. In some embodiments, when a row is activated (e.g., when a row i is activated out of 1,024 rows), the column decoder/driver may "step through" different sets of columns (e.g., accessing 8 columns at a time for a total of 512 times) associated with the activated row i to access all memory cells (e.g., 512×8 memory cells) coupled with the activated row i.

In some embodiments, the ECC array 420 may be configured to include the same number of columns (e.g., 512 columns) as the column planes 415 of the main array 410. Further, the ECC array 420 may be configured to replace (e.g., repair) one or more faulty portions of the main array 410 when the ECC function of the memory device is disabled. Information related to such replacements (e.g., address mapping between the faulty portions of the main array 410 and the portion of ECC array 420 that replaces the faulty portion) may be stored in a nonvolatile memory array (e.g., fuse array, flash memory array) of the memory device such that the information may be maintained when the memory device is disconnected from an electrical power supply. In some embodiments, such replacements may be implemented as part of manufacturing process to increase a production yield of the memory devices.

Block diagram 400a illustrates that a segment (e.g., the segment 425) of a column plane (e.g., the column plane 415b) may be faulty—e.g., due to defects affecting multiple memory cells of the segment 425 or defective periphery circuits coupled with multiple memory cells of the segment 425. In some embodiments, the memory device may replace (depicted with an arrow) the faulty segment 425 of the column plane 415b with a segment 430 of the ECC array 420. Block diagram 400a depicts that the faulty segment 425 and the segment 430 replacing the faulty segment 425 include the same number of columns (e.g., 512 columns of the column planes). Accordingly, when an access command identifies memory cells of the faulty segment 425 of the column plane 415*b*, the memory device may access corresponding memory cells of the segment 430 of the ECC array 420 instead. In some embodiments, the block diagram 400*a* may be referred to as a column plane repair scheme.

Block diagram 400*b* illustrates that one or more memory cells coupled with one or more columns 440 of the main array 410 may be faulty—e.g., due to defects 435. For example, the defect (e.g., defect 435*a*) may affect one or more memory cells coupled with the column 440*a*. In some embodiments, the memory device may replace (depicted with arrows) the faulty columns 440 (e.g., the faulty column 440*a* having defect 435*a*, the faulty column 440*b* having process defect 435*b* of the column plane 415*k*) with ECC columns (e.g., ECC column 450*a*, ECC column 450*b*) of the ECC array 420. Accordingly, when an access command identifies memory cells of the faulty column 440 of the main array 410, the memory device may access corresponding memory cells of the ECC columns 450 of the ECC array 420 instead. In some embodiments, the block diagram 400*b* may be referred to as a column repair scheme.

Figure 5:
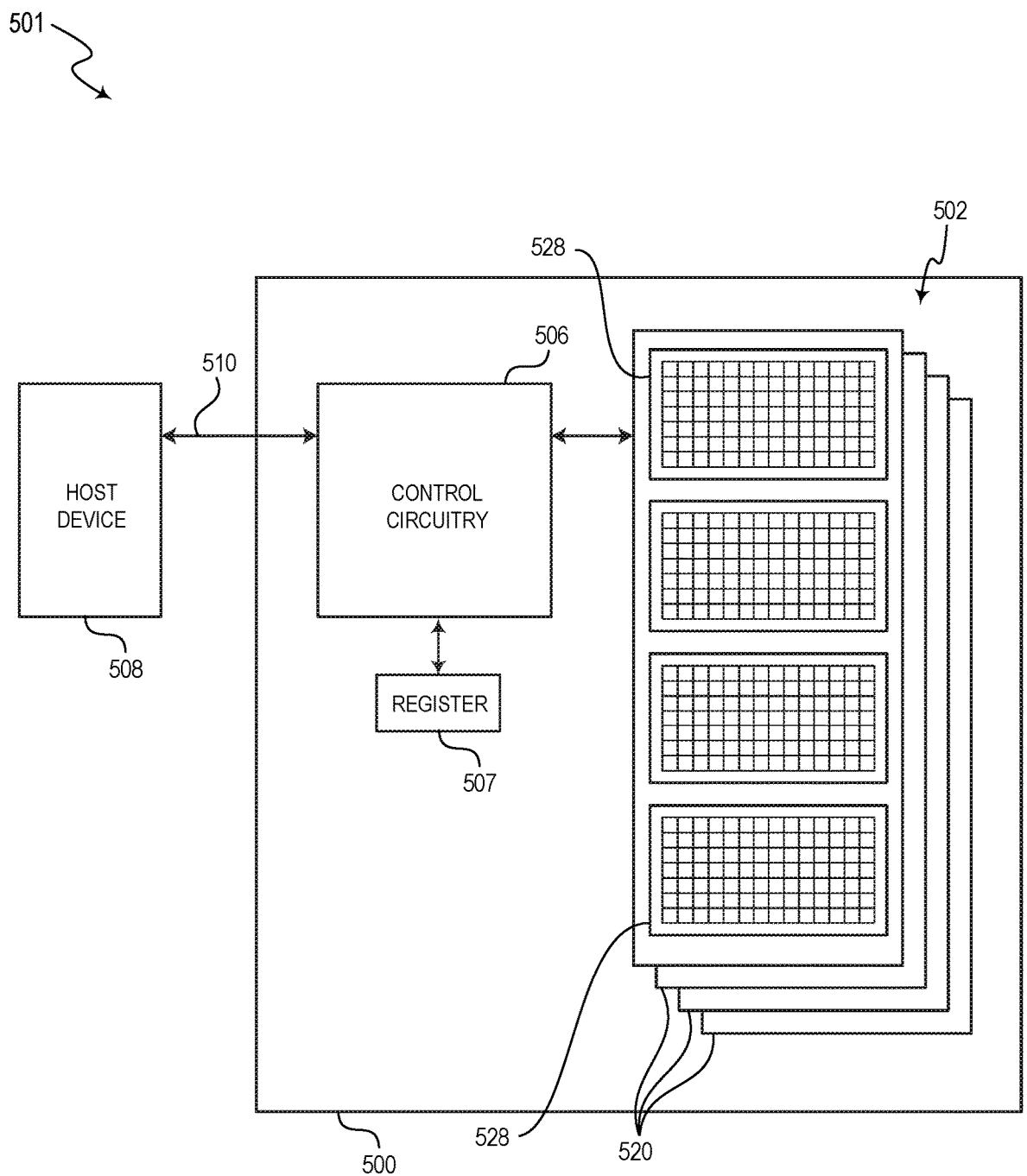
FIG. 5 is a block diagram schematically illustrating a memory system in accordance with an embodiment of the present technology.

FIG. 5 is a block diagram of a system 501 having a memory device 500 configured in accordance with an embodiment of the present technology. The memory device 500 may be an example of or include aspects of the memory devices 100 described with reference to FIG. 1. As shown, the memory device 500 includes a main memory 502 (e.g., DRAM, NAND flash, NOR flash, FeRAM, PCM, etc.) and control circuitry 506 operably coupled to a host device 508 (e.g., an upstream central processor (CPU)). The main memory 502 may be an example or include aspects of the memory array 150, 200, 310, or 410 described with reference to FIG. 1 through 4. Further, the control circuitry 506 include aspects of various components described with reference to FIG. 1. For example, the control circuitry 506 may include aspects of the command/address input circuit 105, the address decoder 110, the command decoder 115, and the input/output circuit 160, among others.

The main memory 502 includes a plurality of memory units 520, which each include a plurality of memory cells. The memory units 520 can be individual memory dies, memory planes in a single memory die, a stack of memory dies vertically connected with through-silicon vias (TSVs), or the like. For example, in one embodiment, each of the memory units 520 can be formed from a semiconductor die and arranged with other memory unit dies in a single device package. In other embodiments, multiple memory units 520 can be co-located on a single die and/or distributed across multiple device packages. The memory units 520 may, in some embodiments, also be sub-divided into memory regions 528 (e.g., banks, ranks, channels, blocks, pages, etc.).

The memory cells can include, for example, floating gate, charge trap, phase change, capacitive, ferroelectric, magnetoresistive, and/or other suitable storage elements configured to store data persistently or semi-persistently. The main memory 502 and/or the individual memory units 520 can also include other circuit components, such as multiplexers, decoders, buffers, read/write drivers, address registers, data out/data in registers, etc., for accessing and/or programming (e.g., writing) the memory cells and other function, such as for processing information and/or communicating with the control circuitry 506 or the host device 508. Although shown in the illustrated embodiments with a certain number of memory cells, rows, columns, regions, and memory units for purposes of illustration, the number of memory cells, rows, columns, regions, and memory units can vary, and can, in other embodiments, be larger or smaller in scale than shown in the illustrated examples. For example, in some embodiments, the memory device 500 can include only one memory unit 520. Alternatively, the memory device 500 can include two, three, four, eight, ten, or more (e.g., 16, 32, 64, or more) memory units 520. Although the memory units 520 are shown in FIG. 5 as including four memory regions 528 each, in other embodiments, each memory unit 520 can include one, two, three, eight, or more (e.g., 16, 32, 64, 100, 128, 256, or more) memory regions.

In some embodiments, the memory device 500 may include a register 507 (which may also be referred to as a mode register) that may be configured to indicate whether an ECC function of the memory device 500 (e.g., on-die ECC function) is enabled or disabled. In some embodiments, a host device 508 coupled with the memory device 500 may perform an ECC function without relying on the on-die ECC function of the memory device 500. In such cases, the register 275 may indicate that the on-die ECC function is disabled (e.g., by the host device) such that the memory device 500 may modify certain operational aspects to provide additional features to the host device—e.g., a power-saving mode.

In one embodiment, the control circuitry 506 can be provided on the same die as the main memory 502 (e.g., including command/address/clock input circuitry, decoders, voltage and timing generators, input/output circuitry, etc.). In another embodiment, the control circuitry 506 can be a microcontroller, special purpose logic circuitry (e.g., a field programmable gate array (FPGA), an application specific integrated circuit (ASIC), control circuitry on a memory die, etc.), or other suitable processor. In one embodiment, the control circuitry 506 can include a processor configured to execute instructions stored in memory to perform various processes, logic flows, and routines for controlling operation of the memory device 500, including managing the main memory 502 and handling communications between the memory device 500 and the host device 508. In some embodiments, the control circuitry 506 can include embedded memory with memory registers for storing, e.g., row counters, bank counters, memory pointers, fetched data, etc. In another embodiment of the present technology, a memory device 500 may not include control circuitry, and may instead rely upon external control (e.g., provided by the host device 508, or by a processor or controller separate from the memory device 500).

The host device 508 can be any one of a number of electronic devices capable of utilizing memory for the temporary or persistent storage of information, or a component thereof. For example, the host device 508 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 508 may be a networking device (e.g., a switch, a router, etc.) or a recorder of digital images, audio and/or video, a vehicle, an appliance, a toy, or any one of a number of other products. In one embodiment, the host device 508 may be connected directly to memory device 500, although in other embodiments, the host device 508 may be indirectly connected to memory device (e.g., over a networked connection or through intermediary devices).

In operation, the control circuitry 506 can directly write or otherwise program (e.g., erase) the various memory regions of the main memory 502. The control circuitry 506 communicates with the host device 508 over a host-device bus or interface 510. In some embodiments, the host device 508 and the control circuitry 506 can communicate over a dedicated memory bus (e.g., a DRAM bus). In other embodiments, the host device 508 and the control circuitry 506 can communicate over a serial interface, such as a serial attached SCSI (SAS), a serial AT attachment (SATA) interface, a peripheral component interconnect express (PCIe), or other suitable interface (e.g., a parallel interface). The host device 508 can send various requests (in the form of, e.g., a packet or stream of packets) to the control circuitry 506. A request can include a command to read, write, erase, return information, and/or to perform a particular operation (e.g., a refresh operation, a TRIM operation, a precharge operation, an activate operation, a wear-leveling operation, a garbage collection operation, etc.).

In some embodiments, the control circuitry 506 can be configured to track operations (e.g., read operations, write operations, erase operations, activate operations, etc.) performed in the main memory 502 (e.g., in a register or table in an embedded memory of the control circuitry 506) in multiple memory units 520 to facilitate performing refresh operations on an as-needed basis. In this regard, the control circuitry 506 can be configured to compare the number or rate of operations experienced by different memory units 520 and to perform or schedule refresh operations on the memory units 520 based on a comparison between the number or rate of operations experienced by the memory units 520. Alternatively, the control circuitry 506 can be configured to perform or schedule refresh operations on the memory units 520 based on a comparison of each memory unit 520 to one or more predetermined thresholds (e.g., threshold numbers of operations, threshold rates of operations, etc.). Accordingly, a memory unit 520 which is the target of operations that exceed a threshold number or rate can be refreshed more frequently than another unit 520, due to the freedom with which different units 520 can be subjected to out-of-order refresh operations.

In some embodiments, the system 501 may include a host device (e.g., the host device 508) and a memory device (e.g., the memory device 500) operable to deactivate one or more components coupled with a circuit configured to support an ECC function for the memory device. In some embodiments, the memory device may include a memory array (e.g., the main memory 502) that includes a first portion configured to store user data and a second portion configured to store ECC data associated with the user data, the second portion coupled with the circuit configured to support the ECC function, and a register configured to indicate whether the ECC function is enabled or disabled based at least in part on signaling received from the host device.

In some embodiments, the memory device 500 may include a memory array including a plurality of memory cells, where the memory array includes a first portion configured to store user data and a second portion configured to store ECC data associated with the user data, an ECC circuit that is coupled with the second portion and performs an ECC function for the user data, and a register configured to indicate whether the ECC function is enabled or disabled. Further, the host device 508 may be configured to provide an input to disable the ECC function. In some embodiments, the memory device 500 may be configured to update the register 507 to indicate the ECC function is disabled based on the input from the host device, determine the ECC function is disabled based on accessing the register, and deactivate one or more components coupled with the ECC circuit after determining that the ECC function is disabled.

Figure 6:
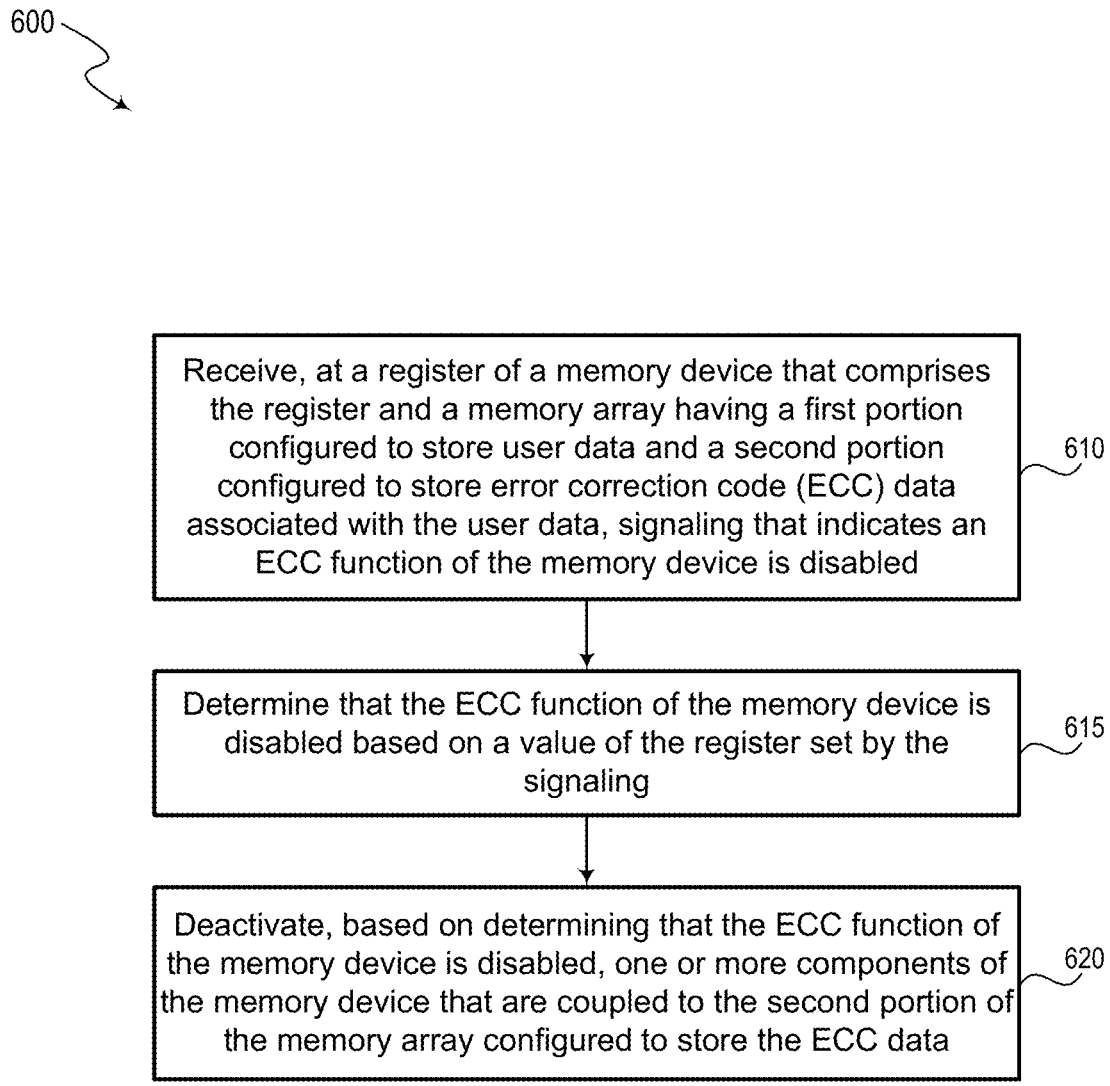
FIG. 6 is a flow chart illustrating a method of operating a memory device in accordance with an embodiment of the present technology.

FIG. 6 is a flow chart 600 illustrating a method of operating a memory device in accordance with an embodiment of the present technology. The flow chart 600 may be an example of or include aspects of a method that the memory device 500 (or the control circuitry 506 of the memory device 500) may perform as described with reference to FIGS. 3 through 5. Such a memory device (e.g., the memory device 500) may include a memory array including a plurality of memory cells, where the memory array includes a first portion configured to store user data and a second portion configured to store error checking and correcting (ECC) data associated with the user data, an ECC circuit that is coupled with the second portion and performs an ECC function for the user data, and a register configured to indicate whether the ECC function is enabled or disabled.

The method includes receiving, at a register of a memory device that comprises the register and a memory array having a first portion configured to store user data and a second portion configured to store error checking and correcting (ECC) data associated with the user data, signaling that indicates an ECC function of the memory device is disabled (box 610). In accordance with one aspect of the present technology, the receiving feature of box 610 can be performed by a control circuitry (e.g., the control circuitry 506 of FIG. 5) as described with reference to FIGS. 1 and 5.

The method further includes determining that the ECC function of the memory device is disabled based at least in part on a value of the register set by the signaling (box 615). In accordance with one aspect of the present technology, the determining feature of box 615 can be performed by the control circuitry (e.g., the control circuitry 506 of FIG. 5) in conjunction with the row decoder 140 and the column decoder 145 as described with reference to FIGS. 1 and 5.

The method further includes deactivating, based at least in part on determining that the ECC function of the memory device is disabled, one or more components of the memory device that are coupled to the second portion of the memory array configured to store the ECC data (box 620). In accordance with one aspect of the present technology, the deactivating feature of box 620 can be performed by the control circuitry (e.g., the control circuitry 506 of FIG. 5) in conjunction with the row decoder 140 and the column decoder 145 as described with reference to FIGS. 1 and 5.

In some embodiments, the method can further include disconnecting an electric power supply from the one or more components based at least in part on determining that the ECC function of the memory device is disabled. In some embodiments, the method can further include generating a control signal that disables the one or more components, and transmitting the control signal to the one or more components during an access operation directed to the memory array, wherein the one or more components are deactivated based at least in part on the control signal. In some embodiments, the method can further include blocking an access command from the one or more components during an access operation directed to the memory array. In some embodiments, the method can further include disabling a plurality of sense amplifiers coupled with the second portion during an access operation directed to the memory array when at least one row of cells of the memory array is activated during the access operation, where the one or more deactivated components comprises the plurality of sense amplifiers.

In some embodiments, the method can further include maintaining a plurality of input/output lines coupled with the second portion of the array at a constant voltage level during an access operation directed to the memory array when at least one row of cells of the memory array is activated during the access operation. In some embodiments, the method can further include disabling a plurality of column drivers coupled with a plurality of columns of the second portion during an access operation directed to the memory array when at least one row of cells of the memory array is activated during the access operation, wherein the one or more deactivated components comprises the plurality of column drivers. In some embodiments, the method can further include disabling a plurality of row drivers of the second portion of the memory array, wherein the one or more deactivated components comprises the plurality of row drivers.

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. An apparatus comprising:
    a memory array including a plurality of memory cells, the memory array including a first portion configured to store user data and a second portion configured to store error checking and correcting (ECC) data associated with the user data;
    an ECC circuit that is coupled with the second portion and performs an ECC function for the user data;
    a register configured to indicate whether the ECC function is enabled or disabled; and
    circuitry configured to:
        determine the ECC function is disabled based on accessing the register; and
        deactivate one or more components of the apparatus that are coupled with the ECC circuit after determining that the ECC function is disabled.

2. The apparatus of claim 1, wherein the circuitry is further configured to connect or disconnect an electric power supply to the one or more components, and wherein deactivating the one or more components includes disconnecting the electric power supply from the one or more components.

3. The apparatus of claim 1, wherein the circuitry is further configured to generate a signal that disables the one or more components during an access operation directed to the memory array, and wherein deactivating the one or more components includes transmitting the signal to the one or more components.

4. The apparatus of claim 1, wherein the circuitry is further configured to block an access command from the one or more components during an access operation directed to the memory array, and wherein deactivating the one or more components includes blocking the access command from the one or more components.

5. The apparatus of claim 1, further comprising a plurality of row drivers coupled with a plurality of rows of the memory array, each row of the plurality of rows coupled with a first memory cell of the first portion and a second memory cell of the second portion.

6. The apparatus of claim 5, wherein deactivating the one or more components includes disabling a plurality of sense amplifiers coupled with the second portion during an access operation directed to the memory array when at least one row of the plurality of rows is activated during the access operation.

7. The apparatus of claim 6, wherein the plurality of sense amplifiers maintains a precharge state during the access operation.

8. The apparatus of claim 5, wherein deactivating the one or more components includes maintaining a plurality of input/output lines coupled with the second portion at a constant voltage level during an access operation directed to the memory array when at least one row of the plurality of rows is activated during the access operation.

9. The apparatus of claim 5, wherein deactivating the one or more components includes disabling a plurality of column drivers coupled with a plurality of columns of the second portion during an access operation directed to the memory array when at least one row of the plurality of rows is activated during the access operation.

10. The apparatus of claim 1, further comprising a first plurality of row drivers coupled with a first plurality of rows of the first portion and a second plurality of row drivers coupled with a second plurality of rows of the second portion, wherein deactivating the one or more components includes deactivating the second plurality of row drivers.

11. The apparatus of claim 1, wherein the one or more components comprise a plurality of sense amplifiers coupled with the second portion, a plurality of input/output lines coupled with the second portion, a plurality of column drivers coupled with the second portion, or a combination thereof.

12. A method comprising:
receiving, at a register of a memory device that comprises the register and a memory array having a first portion configured to store user data and a second portion configured to store error checking and correcting (ECC) data associated with the user data, signaling that indicates an ECC function of the memory device is disabled;
determining that the ECC function of the memory device is disabled based at least in part on a value of the register set by the signaling; and
deactivating, based at least in part on determining that the ECC function of the memory device is disabled, one or more components of the memory device that are coupled to the second portion of the memory array configured to store the ECC data.

13. The method of claim 12, further comprising:
disconnecting an electric power supply from the one or more components based at least in part on determining that the ECC function of the memory device is disabled.

14. The method of claim 12, further comprising:
generating a control signal that disables the one or more components; and
transmitting the control signal to the one or more components during an access operation directed to the memory array, wherein the one or more components are deactivated based at least in part on the control signal.

15. The method of claim 12, further comprising:
blocking an access command from the one or more components during an access operation directed to the memory array.

16. The method of claim 12, further comprising:
disabling a plurality of sense amplifiers coupled with the second portion during an access operation directed to the memory array when at least one row of cells of the memory array is activated during the access operation, wherein the one or more deactivated components comprises the plurality of sense amplifiers.

17. The method of claim 12, further comprising:
maintaining a plurality of input/output lines coupled with the second portion of the array at a constant voltage level during an access operation directed to the memory array when at least one row of cells of the memory array is activated during the access operation.

18. The method of claim 12, further comprising:
disabling a plurality of column drivers coupled with a plurality of columns of the second portion during an access operation directed to the memory array when at least one row of cells of the memory array is activated during the access operation, wherein the one or more deactivated components comprises the plurality of column drivers.

19. The method of claim 12, further comprising:
disabling a plurality of row drivers of the second portion of the memory array, wherein the one or more deactivated components comprises the plurality of row drivers.

20. A memory system comprising:
a host device; and
a memory device operable to deactivate one or more components coupled with a circuit configured to support an error checking and correcting (ECC) function for the memory device, the memory device comprising:
a memory array that comprises a first portion configured to store user data and a second portion configured to store ECC data associated with the user data, the second portion coupled with the circuit configured to support the ECC function; and
a register configured to indicate whether the ECC function is enabled or disabled based at least in part on signaling received from the host device.

* * * * *